US012569925B2

(12) United States Patent
Chen

(10) Patent No.: US 12,569,925 B2
(45) Date of Patent: Mar. 10, 2026

(54) SOLDER JETTING HEAD CAPABLE OF ABSORBING IMPACT, AND RELATED SYSTEMS AND METHODS

(71) Applicant: Kulicke and Soffa Hi-Tech Co., Ltd., New Taipei (TW)

(72) Inventor: Lu-Min Chen, New Tapei (TW)

(73) Assignee: Kulicke and Soffa Hi-Tech Co. Ltd., New Taipei (TW)

( * ) Notice: Subject to any disclaimer, the term of this patent is extended or adjusted under 35 U.S.C. 154(b) by 0 days.

(21) Appl. No.: 18/828,032

(22) Filed: Sep. 9, 2024

(65) Prior Publication Data

US 2025/0091149 A1     Mar. 20, 2025

Related U.S. Application Data

(60) Provisional application No. 63/539,368, filed on Sep. 20, 2023.

(51) Int. Cl.
*B23K 3/06*          (2006.01)
(52) U.S. Cl.
CPC .................................. B23K 3/0623 (2013.01)
(58) Field of Classification Search
CPC ..... B23K 6/06; B23K 6/0638; B05C 11/1034; B05C 5/02; B05C 5/0225; B05C 5/0237; B05C 5/0239
See application file for complete search history.

(56) References Cited

U.S. PATENT DOCUMENTS 5,292,068 A        3/1994  Raterman et al.
5,364,109 A  *  11/1994  Sihon ...................... F02F 7/006
277/592

5,598,974 A        2/1997  Lewis et al.
6,267,266 B1  *   7/2001  Smith ................... G01F 13/006
222/61
10,105,946 B2  *  10/2018  Nakamura ............ B05C 5/0225
10,384,227 B2  *   8/2019  Sakai ................... B41J 2/04588
11,167,297 B2  *  11/2021  Fritz ..................... B05B 1/3046
2004/0074994 A1  *   4/2004  Ganzer ................. F16K 25/005
239/533.1

(Continued)

FOREIGN PATENT DOCUMENTS

CN        204261844        2/2015
JP        2008188496        8/2008
WO        2018073077        4/2018

OTHER PUBLICATIONS

International Search Research for International PCT application No. PCT/CN2024/117682 mailed on Nov. 21, 2024.

*Primary Examiner* — Keith Walker
*Assistant Examiner* — Carlos J Gamino
(74) *Attorney, Agent, or Firm* — Christopher M. Spletzer, Sr.

(57)          ABSTRACT

A solder jetting head for depositing a solder paste onto a target surface is provided. The solder jetting head comprises: a tappet portion driven to provide a striking force; a nozzle portion for forming an enclosing contact with the tappet portion, the nozzle portion being configured to force the solder paste to exit from the nozzle portion; a support portion for supporting the nozzle portion; and a buffering portion positioned between the support portion and the nozzle portion, the buffering portion being configured to absorb impact energy generated when the enclosing contact is formed.

17 Claims, 9 Drawing Sheets

(56)        References Cited

U.S. PATENT DOCUMENTS

| | | | |
|---|---|---|---|
| 2005/0095365 A1* | 5/2005 | Acum | B05C 5/0225 |
| | | | 118/323 |
| 2006/0102754 A1 | 5/2006 | Ayers et al. | |
| 2006/0243758 A1* | 11/2006 | Parks | B05C 5/0225 |
| | | | 222/504 |
| 2012/0085842 A1* | 4/2012 | Ciardella | B41J 2/04 |
| | | | 239/569 |
| 2014/0124600 A1* | 5/2014 | Ciardella | B41J 2/04 |
| | | | 239/569 |
| 2014/0263738 A1* | 9/2014 | Aguilar | F16K 31/1221 |
| | | | 137/15.01 |
| 2016/0059455 A1* | 3/2016 | Altonen | B29C 33/0038 |
| | | | 425/149 |
| 2018/0085777 A1 | 3/2018 | Sakai et al. | |
| 2019/0203559 A1* | 7/2019 | Ezell | E21B 33/134 |
| 2022/0162902 A1* | 5/2022 | Snader | E06B 1/36 |

* cited by examiner

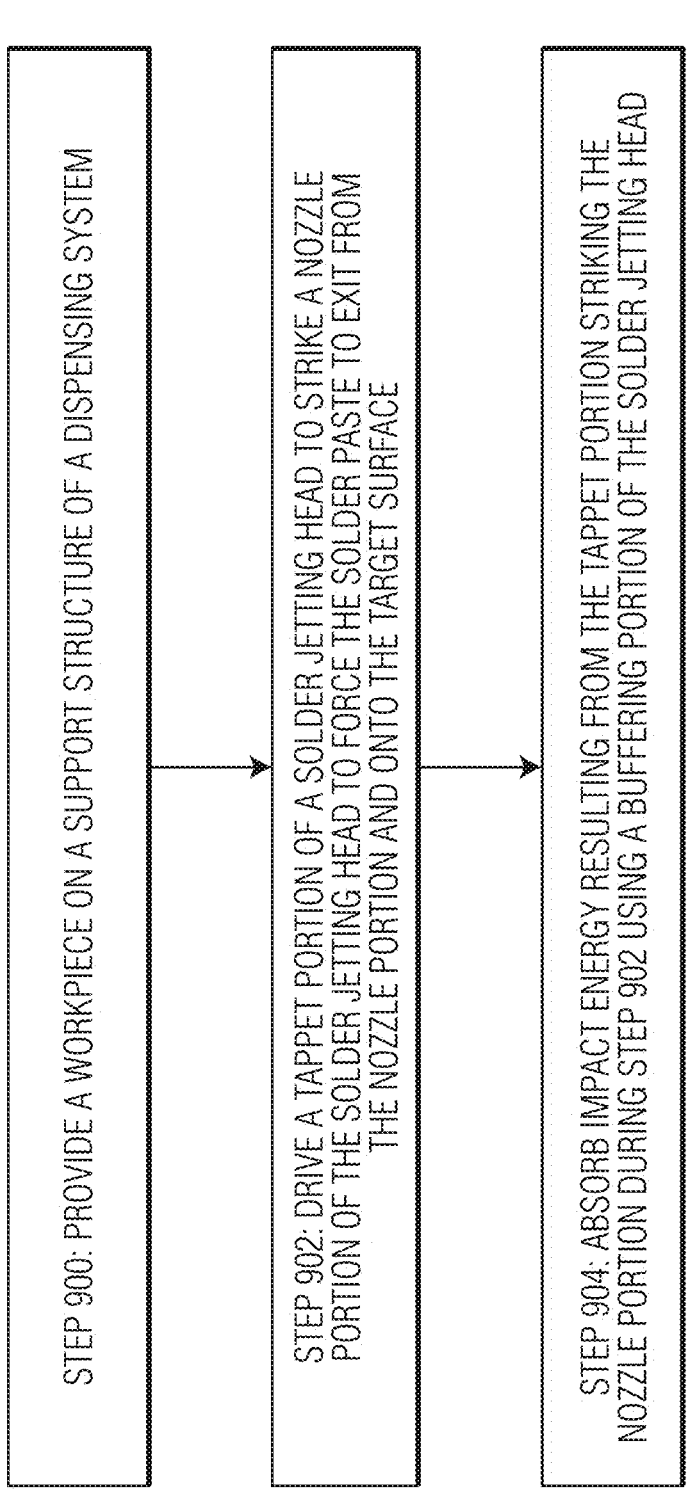

STEP 900: PROVIDE A WORKPIECE ON A SUPPORT STRUCTURE OF A DISPENSING SYSTEM

STEP 902: DRIVE A TAPPET PORTION OF A SOLDER JETTING HEAD TO STRIKE A NOZZLE PORTION OF THE SOLDER JETTING HEAD TO FORCE THE SOLDER PASTE TO EXIT FROM THE NOZZLE PORTION AND ONTO THE TARGET SURFACE

STEP 904: ABSORB IMPACT ENERGY RESULTING FROM THE TAPPET PORTION STRIKING THE NOZZLE PORTION DURING STEP 902 USING A BUFFERING PORTION OF THE SOLDER JETTING HEAD

FIG. 9

SOLDER JETTING HEAD CAPABLE OF ABSORBING IMPACT, AND RELATED SYSTEMS AND METHODS

CROSS-REFERENCE TO RELATED APPLICATION

This application claims the benefit of U.S. Provisional Application No. 63/539,368, filed Sep. 20, 2023, the content of which is incorporated herein by reference.

FIELD

The invention relates to a solder jetting head, and in particular, to a solder jetting head capable of absorbing impact.

BACKGROUND

In the processing and packaging of semiconductor devices, jetting is a non-contact printing process which applies solder paste directly to the printed circuit board (PCB) pad. Jetting eliminates the need for a change in Z-axis movement. It significantly increases the speed of placing deposits onto any surface versus contact dispensing. Jetting also makes it easier to deposit solder paste onto surfaces of varying heights. During jetting, small solder paste deposits are placed at a rate of over 1 million dots per hour, to accurately construct the optimum typography for every pad position on the PCB.

However, in a conventional solder jetting head, since a tappet portion is required to strike a nozzle portion with a force great enough for the solder paste deposits to exit through a nozzle opening, there is a problem that when the tappet portion strikes the nozzle portion, impact occurs, and impact energy is acted upon the tappet portion and the nozzle portion. After a certain period of time, the impact energy may cause damages to the tappet portion and the nozzle portion. Thus, replacement may be needed, and the jetting process has to be stopped. Thus, it would lower efficiency and increase the time and cost of production.

Referring now to the drawings, FIG. 1 is a cross-sectional view showing a conventional solder jetting head. The conventional solder jetting head shown in FIG. 1 includes a tappet portion 10, a nozzle portion 20, and a support portion 30. The tappet portion 10 is driven by a motor (not shown) to provide a striking force (shown by the dark solid arrow). When the tappet portion 10 is driven down toward the nozzle portion 20, the tappet portion 10 would form an enclosing contact with the nozzle portion 20, so as to force a solder paste 50 to exit a nozzle opening 60 in a controlled amount onto a target surface. The support portion 30 is used to support the nozzle portion 20, so that the nozzle portion 20 remains in a stable position after being struck by the tappet portion 10.

However, when the tappet portion 10 contacts with the nozzle portion 20 to form the enclosing contact, since a shape of the striking end of the tappet portion 10 of a conventional solder jetting head is in a semispherical shape, the contact between the tappet portion 10 and the nozzle portion 20 would cause the tappet portion 10 and the nozzle portion 20 to hit and squeeze solder particles 40 in the solder paste 50. It is shown by the enlarged portion of FIG. 1. Further, since the solder particles 40 in the solder paste 50 are metal particles that are relatively softer than the tappet portion 10 and the nozzle portion 20, this contact would cause the solder particles 40 in the solder paste 50 to be hit and squeezed by the contact surface, and thus deform into solder sheets (shown as flat particles in the enlarged portion of FIG. 1). The squeezed solder particles 40 (the solder sheets) may adhere on the contact surfaces. After a while, the solder sheets accumulate and grow larger, and the accumulated solder sheets would eventually prevent the tappet portion 10 and the nozzle portion 20 to form the enclosing contact. The leaked contact would make the controlled amount deposited onto the target surface unstable. Otherwise, the solder sheets may interfere with the exiting of the solder paste 50 by causing blockage of the nozzle opening 60. Thus, the solder jetting head would have to be replaced or cleaned, and the jetting process would be interfered. Thus, it would increase the time and cost of production.

Furthermore, since the contact between the tappet portion 10 and the nozzle portion 20 would also generate impact energy upon each other, instantaneous change in momentum and shock waves would be generated. It would cause the tappet portion 10 and the nozzle portion 20 to deteriorate.

Thus, due to the abovementioned problems of the conventional solder jetting head, the solder jetting head would have to be replaced, and the jetting process would be interfered. Thus, it would increase the time and cost of production.

Thus, the primary objective of the invention is to provide a solder jetting head capable of absorbing impact.

SUMMARY

In order to achieve the above objective, a solder jetting head for depositing a solder paste onto a target surface is provided. The solder jetting head according to the invention comprises: a tappet portion driven to provide a striking force; a nozzle portion for forming an enclosing contact with the tappet portion, the nozzle portion being configured to force the solder paste to exit from the nozzle portion; a support portion for supporting the nozzle portion; and a buffering portion positioned between the support portion and the nozzle portion, the buffering portion being configured to absorb impact energy generated when the enclosing contact is formed.

According to another exemplary embodiment of the invention, a dispensing system for depositing a solder paste onto a target surface is provided. The dispensing system includes a support structure for supporting a workpiece during a dispensing operation. The dispensing system also includes a solder jetting head including (i) a tappet portion driven to provide a striking force, (ii) a nozzle portion for forming an enclosing contact with the tappet portion, the nozzle portion being configured to force the solder paste to exit from the nozzle portion, (iii) a support portion for supporting the nozzle portion, and (iv) a buffering portion positioned between the support portion and the nozzle portion, the buffering portion being configured to absorb impact energy generated when the enclosing contact is formed.

According to other embodiments of the invention, the solder jetting head and/or the dispensing system recited in the two immediately preceding paragraphs may have any one or more of the following features: the buffering portion includes an elastic structure; the buffering portion includes a thermoplastic elastomer; the buffering portion includes a spring; the buffering portion includes a magnetic assembly; the buffering portion includes an air cushion; the buffering portion includes a damper; the buffering portion includes a plurality of layers of different material; the buffering portion includes a first layer, a second layer, and a third layer; and the first layer includes a first material, the second layer includes a second material, and the third layer includes the first material.

According to another exemplary embodiment of the invention, a method of dispensing a solder paste onto a target surface is provided. The method includes the steps of: (a) providing a workpiece on a support structure of a dispensing system; (b) driving a tappet portion of a solder jetting head to strike a nozzle portion of the solder jetting head to force the solder paste to exit from the nozzle portion and onto the target surface; and (c) absorbing impact energy resulting from the tappet portion striking the nozzle portion during step (b) using a buffering portion of the solder jetting head.

According to other embodiments of the invention, the method recited in the immediately preceding paragraph may have any one or more of the following features: step (c) includes absorbing impact energy with an elastic structure of the buffering portion; and step (c) includes absorbing impact energy with a thermoplastic elastomer of the buffering portion.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 9 is a flow diagram illustrating a method of dispensing a solder paste onto a target surface in accordance with an exemplary embodiment of the invention.

DETAILED DESCRIPTION

Figure 1:
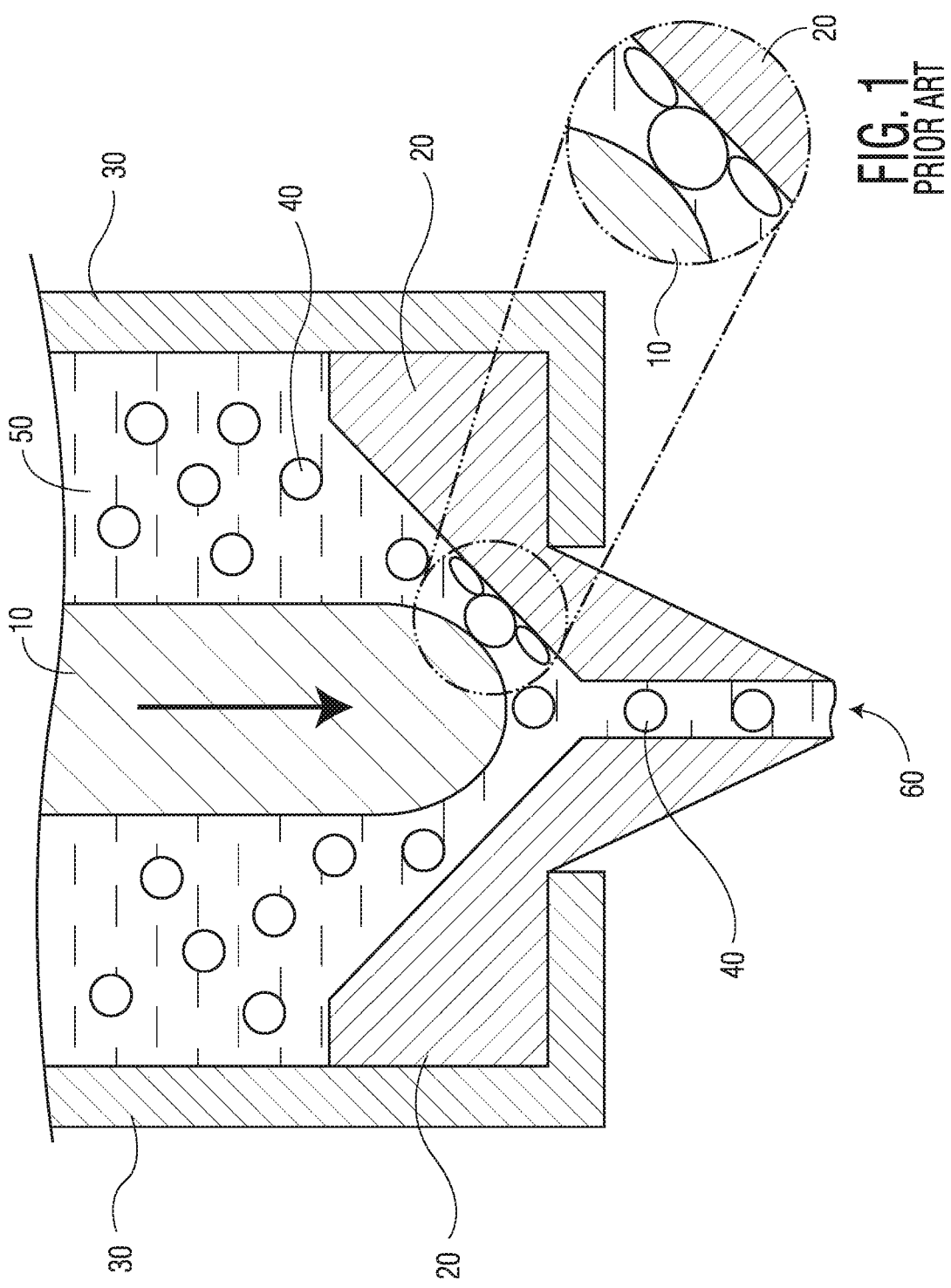
FIG. 1 is a cross-sectional view illustrating a conventional solder jetting head.

As used herein, the term "enclosing contact" is intended to refer to the contact made between a tappet portion and a nozzle portion of the solder jetting head. The enclosing contact means that the contact is made between the tappet portion and the nozzle portion in a circumferential direction of the tappet portion or the nozzle portion to force the solder paste in an only remaining direction (i.e., an exiting direction through a nozzle opening). Consequently, since an example of the tappet portion is a cylinder with a semi-spherical end, it can be understood that the enclosing contact forms as a ring shape between the tappet portion and the nozzle portion of the solder jetting head.

As used herein, the term "striking force" is intended to refer to the force generated by a motor of a solder jetting head that is used to form the enclosing contact between the tappet portion and the nozzle portion of the solder jetting head. This striking force pushes a controlled amount of solder paste to exit from a nozzle opening of the solder jetting head, so that the controlled amount of solder paste can deposit on any desired surface.

As used herein, the term "solder paste" is intended to refer to any mixture of solder particles (powder) and flux. During jetting, the solder particles could be affected by the enclosing contact between the tappet portion and the nozzle portion of the solder jetting head. That is, the solder particle may be compressed between the tappet portion and the nozzle portion, so as to deform, accumulate, and eventually interfere with the exiting of the solder paste deposits. According to the invention, the compositions or types of the solder paste are not limited. Further, the solder particles shown in the drawings are only intended for the purpose of demonstrating the effect of the forces acted upon the particles or the position of the particles. The solder particles are actually mixed into the solder paste in an evenly distributed manner.

Throughout the various drawings provided herein, the same reference numbers refer to the same element. Thus, a description of certain elements may be omitted in connection with some of the drawings.

Figure 2:
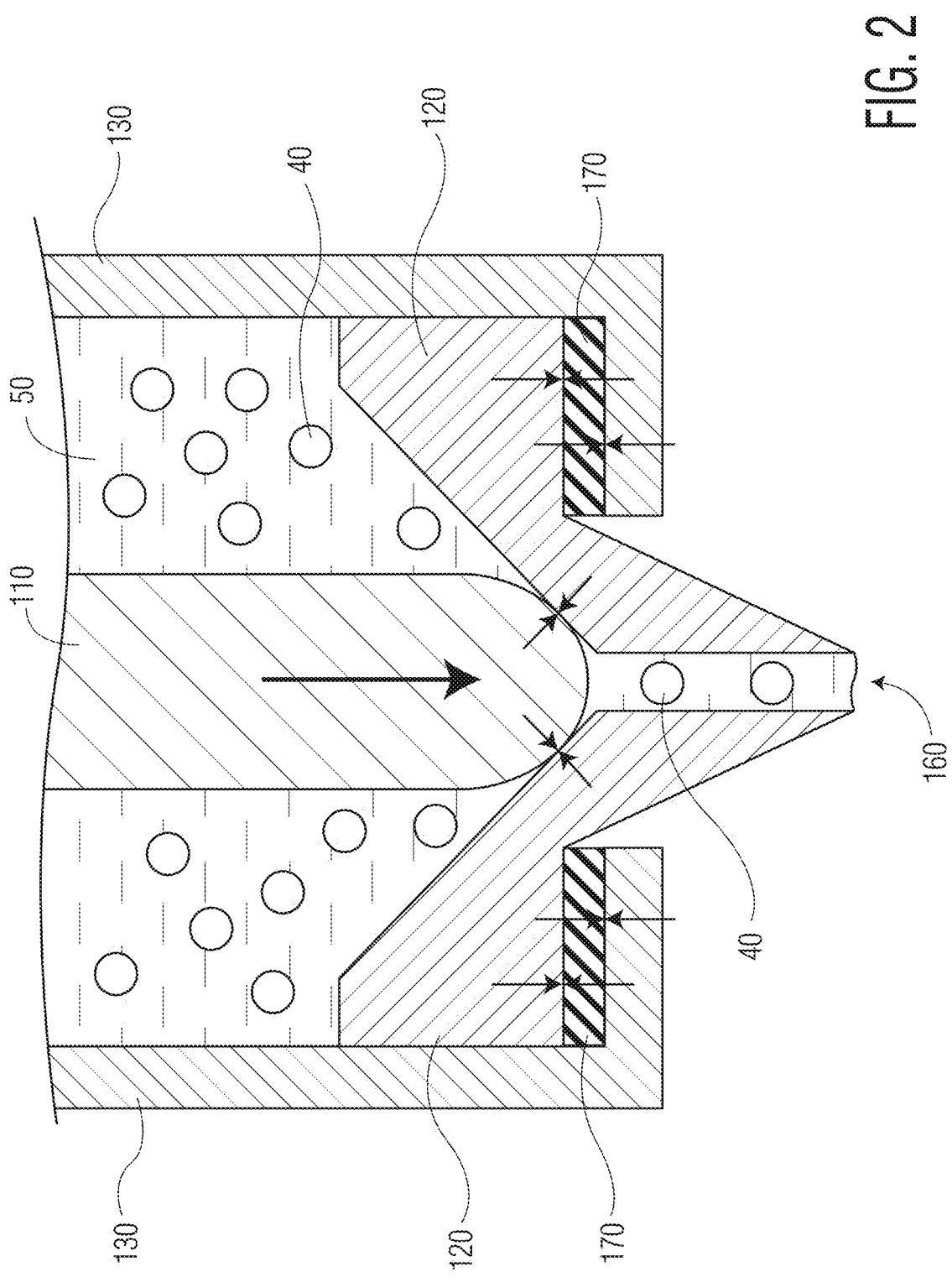
FIGS. 2-7 are cross-sectional views illustrating solder jetting heads in accordance with various exemplary embodiments of the invention.

FIG. 2 is a cross-sectional view showing a solder jetting head 100 in accordance with an embodiment of the invention. The solder jetting head 100 of the invention includes a tappet portion 110, a nozzle portion 120, a support portion 130, and a buffering portion 170. The tappet portion 110 is driven by a motor (not shown) to provide a striking force (shown by the dark solid arrow). When the tappet portion 110 is driven downward to contact with the nozzle portion 120, the tappet portion 110 forms an enclosing contact with the nozzle portion 120, so as to force a solder paste 150 to exit a nozzle opening 160 in a controlled amount onto a target surface. The support portion 130 is used to support the nozzle portion 120, so that the nozzle portion 120 remains in a stable position after being struck by the tappet portion 110. The buffering portion 170 is positioned between the support portion 130 and the nozzle portion 120, so as to absorb the impact energy generated when the enclosing contact is formed. Solder jetting head 100, though shown as a cross section, is circular (e.g., as if the cross section were revolved around a vertical axis), but the invention is not limited, as it is contemplated that the invention could be utilized with a solder jetting head of any shape.

Buffering portion 170 includes an elastic structure, i.e., a structure including a portion that deforms as a result of the impact energy generated when the enclosing contact is formed, then elastically reforms when the enclosing contact ends. In particular, the elastic structure of buffering portion 170 includes an elastic material, such as natural or synthetic rubber, an elastomer (e.g., a thermoplastic elastomer (TPE)), etc. Such an elastic material may be elastically deformed by the enclosing contact, then reform to its original shape once the enclosing contact is removed.

Referring to FIG. 2, when the tappet portion 110 comes in contact with the nozzle portion 120, reaction forces occur between the tappet portion 110 and the nozzle portion 120, between the nozzle portion 120 and the buffering portion 170 and between the buffering portion 170 and the support portion 130 (shown by the opposing arrows therebetween), and the impact energy is created.

However, the buffering portion 170 according to the invention is configured to absorb the impact energy (e.g., some or all of the impact energy caused by the formation of the enclosing contact). That is, when the enclosing contact between the tappet portion 110 and the nozzle portion 120 occurs, the aforementioned impact energy is absorbed by the buffering portion 170. In other words, at the moment of impact, the impact energy is immediately transferred from the nozzle portion 120 to the buffering portion 170, so that the impact energy upon the tappet portion 110, the nozzle portion 120, and solder particles 140 are drastically decreased.

Consequently, since the impact energy is absorbed by the buffering portion 170 (that is, the instantaneous change in momentum and shock waves are absorbed), not only does the impact energy acting upon the tappet portion 110 and the nozzle portion 120 not deteriorate the tappet portion 110 and the nozzle portion 120, but also the impact energy acting upon the solder particles 140 in the solder paste 150 does not squeeze or damage the solder particles 140.

In more detail, when the impact energy acted upon the solder particles 140 in the solder paste 150 is absorbed, the solder particles 140 do not deform into solder sheets. Further, the solder particles 140 do not accumulate as solder sheets, and blockage of the nozzle opening 160 does not occur. Thus, replacement or cleaning of the solder jetting head 100 is not required.

In more detail, when the impact energy acted upon the tappet portion 110 is absorbed (e.g., the instantaneous change in momentum and shock waves acted upon the tappet portion 110 are absorbed), and the tappet portion 110 does not deteriorate. Thus, replacement of the solder jetting head 100 is not required.

In more detail, when the impact energy acted upon the nozzle portion 120 is absorbed, the instantaneous change in momentum and shock waves acted upon the nozzle portion 120 are absorbed, and the nozzle portion 120 does not deteriorate. Thus, replacement of the solder jetting head 100 is not required.

In conclusion, when the impact energy acted upon the solder particles 140 in the solder paste 150, the tappet portion 110, and the nozzle portion 120 is absorbed, the solder particles 140 do not accumulate as solder sheets, and blockage of the nozzle opening 160 does not occur, and the tappet portion 110 and the nozzle portion 120 do not deteriorate. Thus, replacement or cleaning of the solder jetting head 100 is not required. Thus, it would increase efficiency and decrease production costs.

Although FIG. 2 is described and illustrated as including an elastic structure made of a single elastic material, the invention is not limited to such. It is contemplated that any structure may be used to achieve the object(s) of the invention (e.g., absorbing impact energy, momentum, and/or shockwaves). FIGS. 3-7, described herein, illustrate additional embodiments of the invention.

Figure 3:
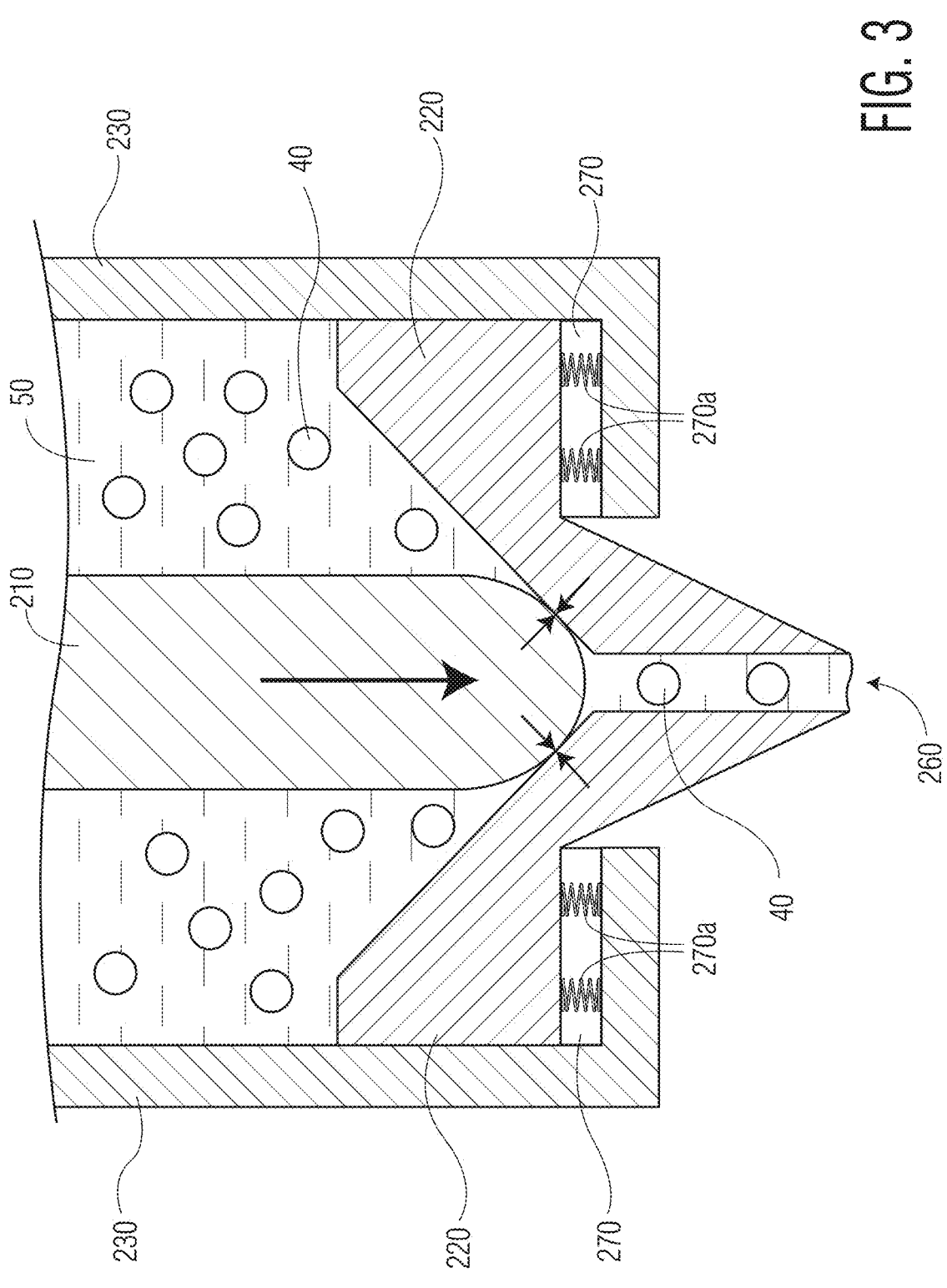

Referring now to FIG. 3, a solder jetting head 200 is illustrated. Solder jetting head 200 includes a tappet portion 210, a nozzle portion 220, a support portion 230, and a buffering portion 270. Buffering portion 270 includes an elastic structure including at least one spring 270a. In particular, buffering portion 270 includes a plurality of springs 270a arranged at intervals throughout buffering portion 270. Springs 270a are configured to be compressed by the enclosing contact, then to return to their original shape after the enclosing contact is removed. Although FIG. 3 illustrates a plurality of springs, it is contemplated that a single spring could be used as the elastic structure (e.g., where the single spring is concentric with tappet portion 210 and/or nozzle opening 260).

Figure 4:
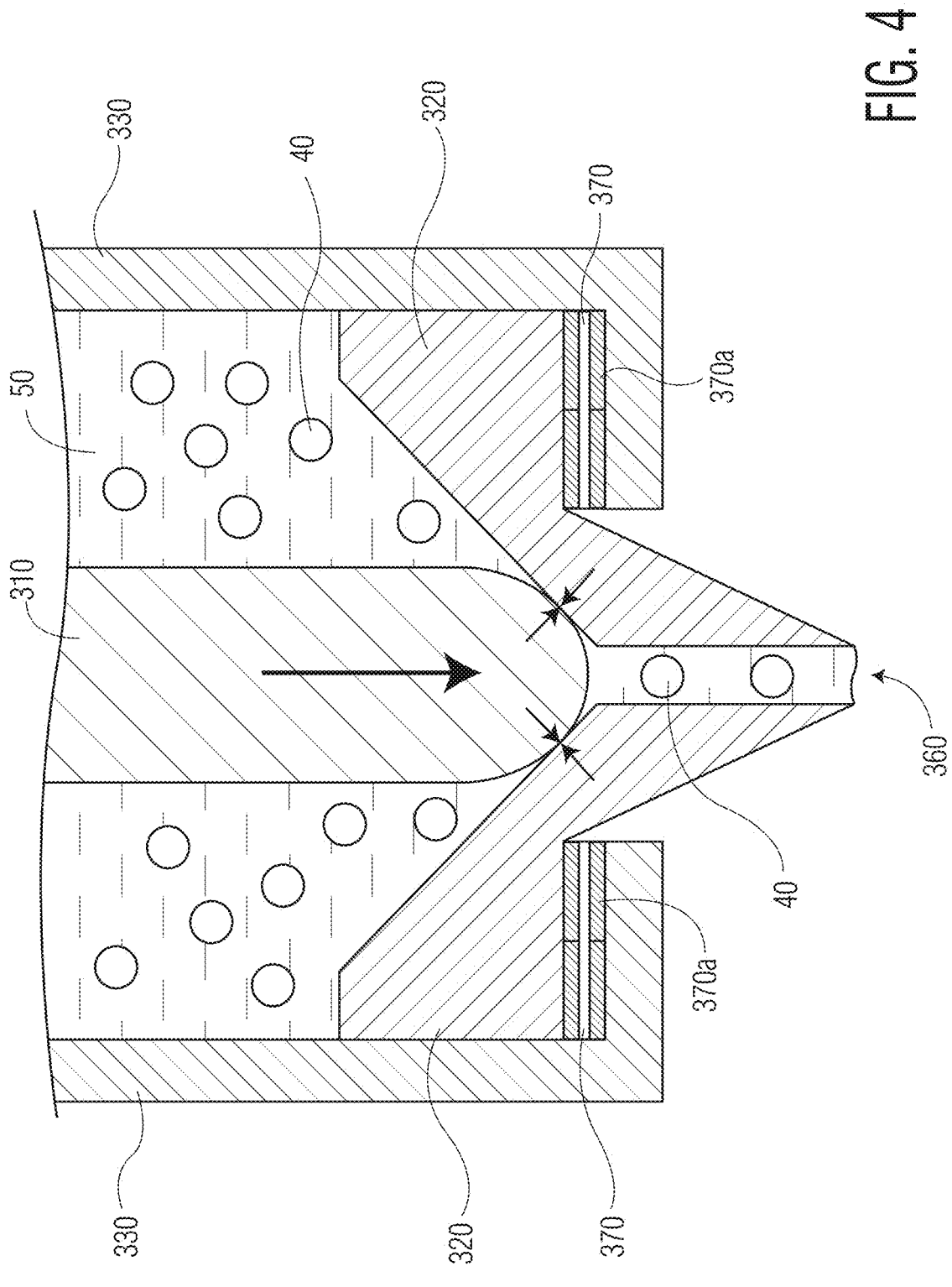

FIG. 4 illustrates a solder jetting head 300. Solder jetting head 300 includes a tappet portion 310, a nozzle portion 320, a support portion 330, and a buffering portion 370. Buffering portion 370 includes a magnetic assembly 370a. Magnetic assembly 370a includes a plurality of magnets configured to repel each other. For example, when the enclosing contact moves nozzle portion 320 toward support portion 330, the north poles of the magnets disposed on nozzle portion 320 will move toward the north poles of the magnets disposed on support portion 330, thus repelling each other (and likewise for the south poles). The invention is, however, not limited to such a configuration (e.g., magnets could be arranged vertically rather than horizontally, magnets could be ring-shaped and coaxial with nozzle 360, etc.).

Figure 5:
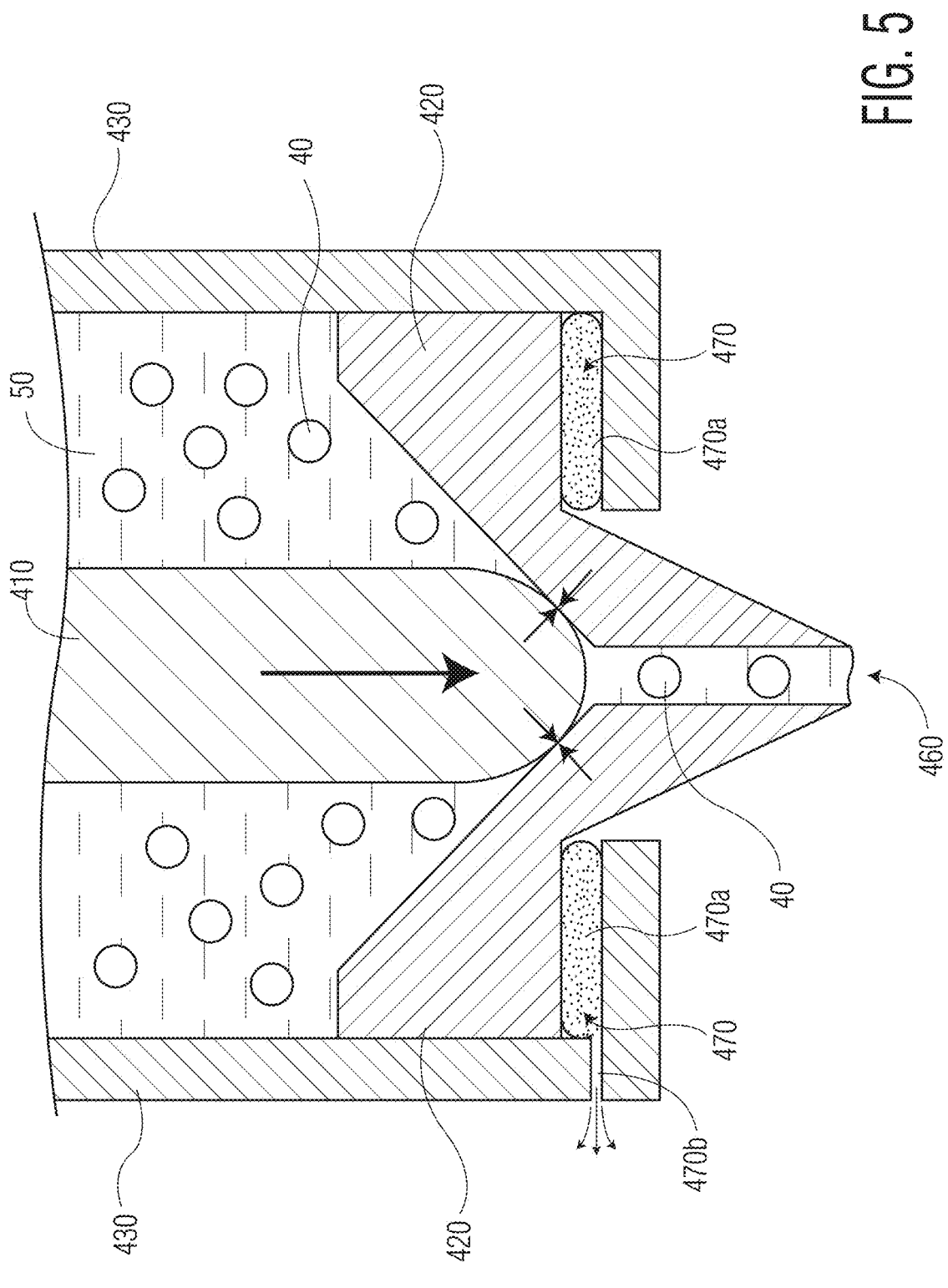

FIG. 5 illustrates a solder jetting head 400. Solder jetting head 400 includes a tappet portion 410, a nozzle portion 420, a support portion 430, and a buffering portion 470. Buffering portion 470 includes an air cushion 470a and an airway 470b. Air cushion 470a is configured to deform resulting from the enclosing contact, thus squeezing air (or any other fluid) out through airway 470b. To reinflate and return to its original shape, a pump or other structure may be used to apply positive pressure through airway 470b and into air cushion 470a. Although air cushion 470a is illustrated and described as including an airway 470b, the invention is not limited. It is contemplated that an air cushion could be enclosed and absorb impact energy by compressing under the enclosing contact, and returning to its original shape after the enclosing contact is removed via decompression as the enclosing contact is removed.

Figure 6:
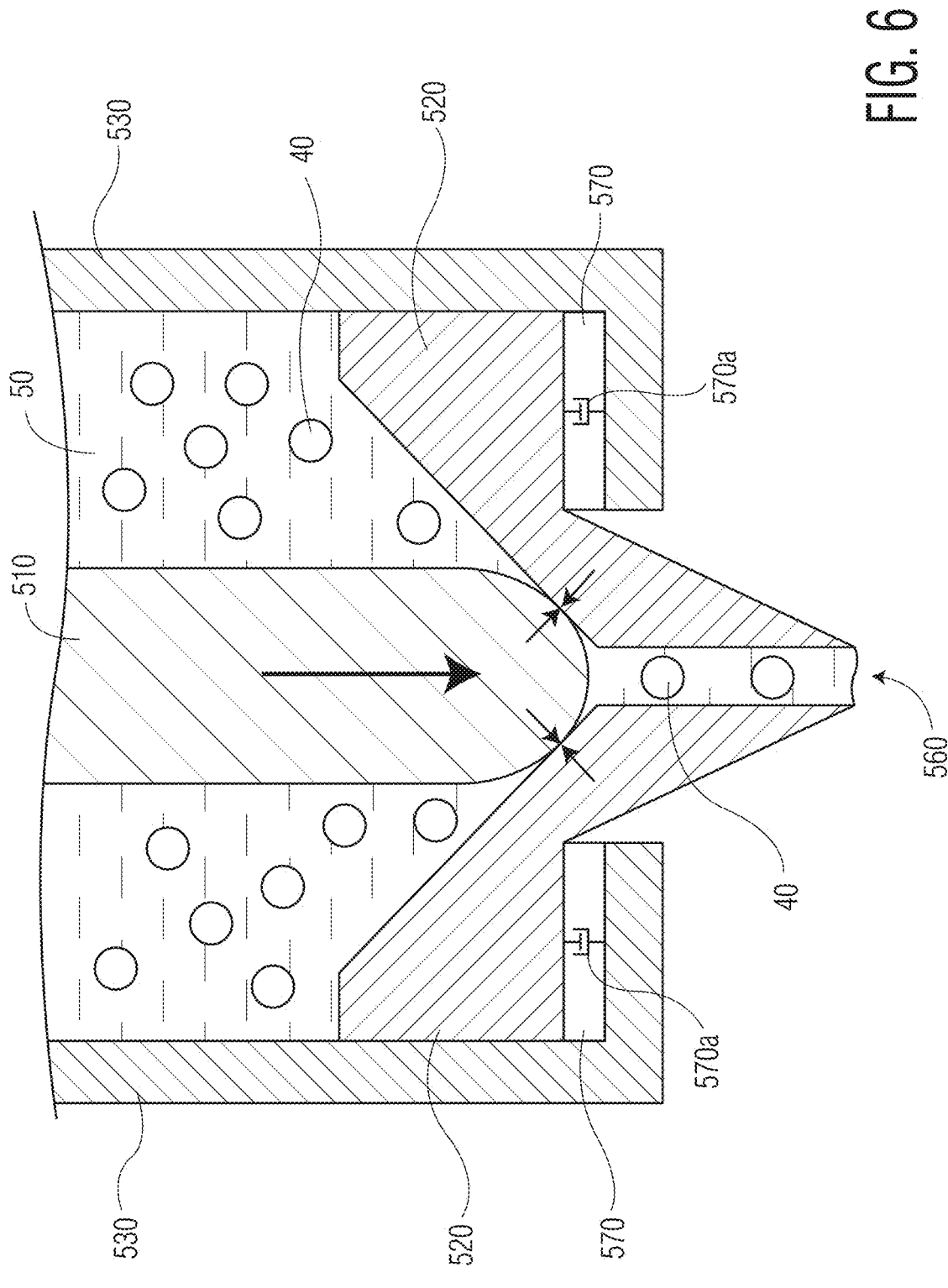

FIG. 6 illustrates a solder jetting head 500. Solder jetting head 500 includes a tappet portion 510, a nozzle portion 520, a support portion 530, and a buffering portion 570. Buffering portion 570 includes a damper 570a. Damper 570a is configured to absorb impact energy resulting from the enclosing contact. Damper 570a may include, or be paired with, an elastic structure (e.g., a spring) to return buffering portion 570 to its original shape after the enclosing contact is removed.

Figure 7:
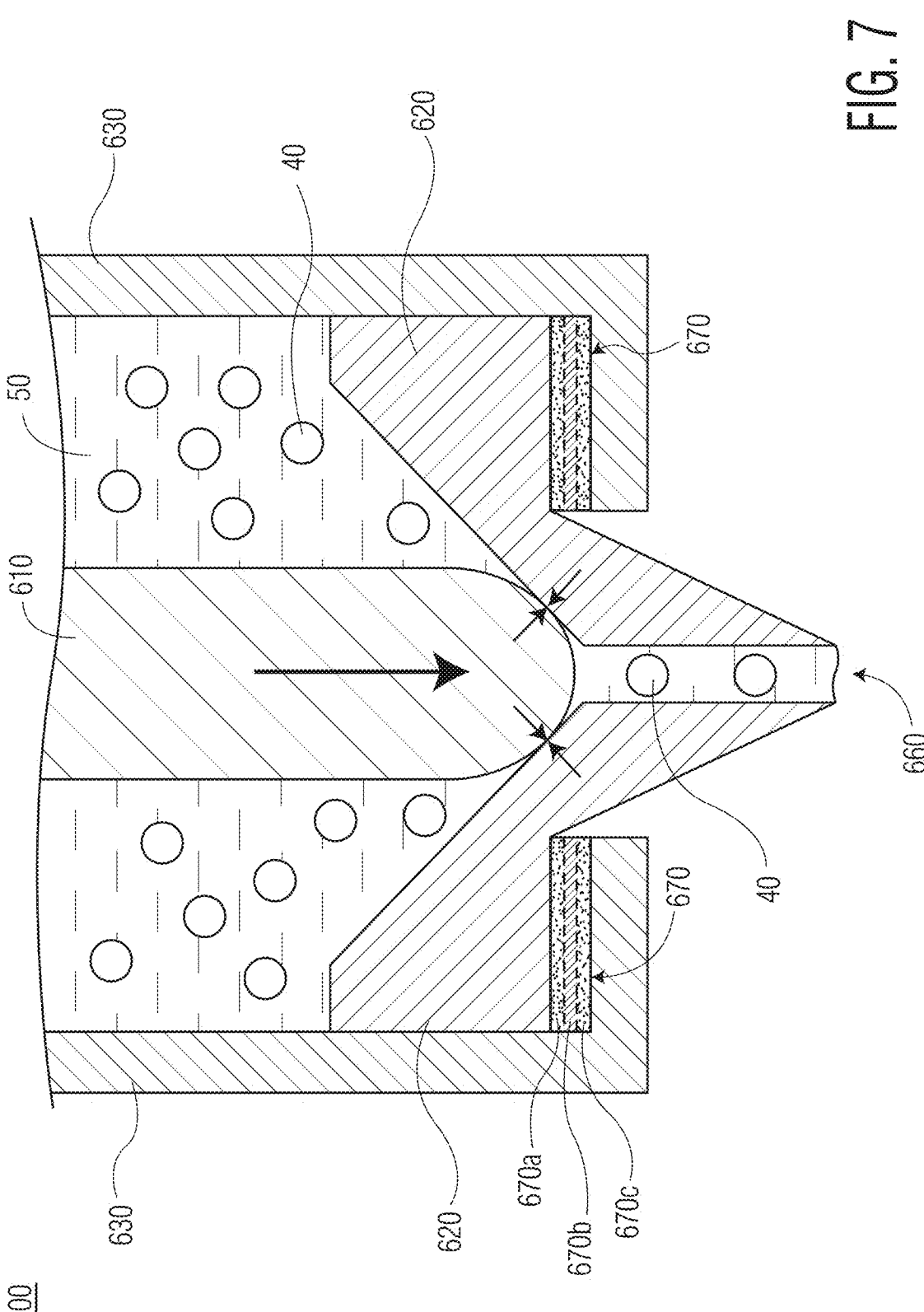

FIG. 7 illustrates a solder jetting head 600. Solder jetting head 600 includes a tappet portion 610, a nozzle portion 620, a support portion 630, and a buffering portion 670. Buffering portion 670 includes a plurality of elastic material layers, 670a, 670b, and 670c. Elastic material layers 670a, 670b, and 670c may include a thermoplastic elastomer (TPE) or any other elastomer that could be used to absorb impact energy. For example, the elastic structure may be a three layer structure with two layers of the same material and one layer of a different material interposed between the two layers (e.g., a layer of natural rubber between two layers of TPE), or the elastic structure may be a three layer structure with three different materials (e.g., a layer of natural rubber, a layer of TPE, and a layer of another elastomer), etc. In FIG. 7, elastic material layers 670a and 670c include the same material (e.g., natural rubber), and elastic material layer 670b is made of a different material from the other layers.

Figure 8:
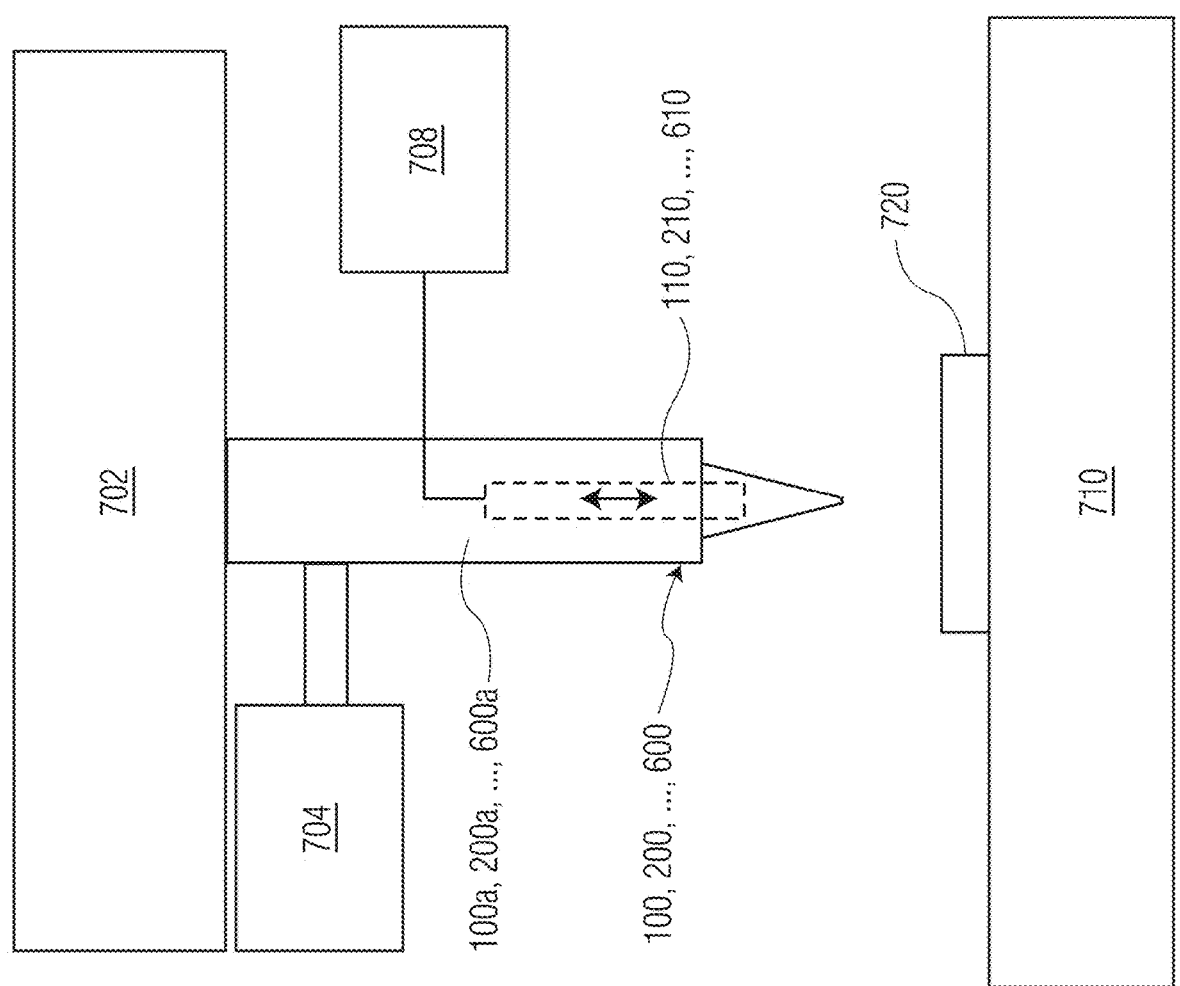
FIG. 8 is a block diagram side view illustrating a dispensing system in accordance with an exemplary embodiment of the invention.
Figure 8:

FIGS. 2-6 illustrate only a dispensing end of various solder jetting heads. However, a solder jetting head is conventionally included as an element of a dispensing system. FIG. 8 illustrates such an exemplary dispensing system 700. Dispensing system 700 includes a support structure 710 for supporting a workpiece 720 (e.g., a semiconductor wafer, a printed circuit board, a semiconductor package, a glass substrate, a leadframe, a miniature device (e.g., an LED, a camera, etc.), etc.). Dispensing system 700 also includes a motion system 702 (e.g., a gantry with linear motor(s)) for moving solder jetting head 100, 200, . . . , 600 (e.g., along an X, Y, and/or Z axis, about a rotative axis, etc.). Solder jetting head 100, 200, . . . , 600 shown in FIG. 8 may represent any solder jetting head within the scope of the invention (e.g., solder jetting head 100 of FIG. 2, solder jetting head 200 of FIG. 3, etc.). Motion system 702 is used to position solder jetting head 100, 200, . . . , 600 over workpiece 720. Dispensing system 700 further includes a solder supply 704 for providing solder to a cavity 100a, 200a, . . . , 600a of solder jetting head 100, 200, . . . , 600, respectively. Dispensing system 700 further includes a motor 708 for driving tappet portion 110, 210, . . . , 610.

FIG. 9 is a flow diagram illustrating a method of dispensing a solder paste onto a target surface of a workpiece (e.g., using any of the previously described solder jetting heads and/or dispensing systems). As is understood by those skilled in the art, certain steps included in the flow diagram may be omitted, certain additional steps may be added, and the order of the steps may be altered from the order illustrated—all within the scope of the invention.

At Step 900, a workpiece is provided on a support structure of a dispensing system (e.g., workpiece 720 provided to dispensing system 700). At Step 902, a tappet portion of a solder jetting head is driven to strike a nozzle portion of the solder jetting head to force the solder paste to exit from the nozzle portion and onto the target surface. At Step 904, impact energy resulting from the tappet portion striking the nozzle portion during step 902 is absorbed using a buffering portion of the solder jetting head (e.g., buffering portion 170, 270, . . . , 670, or any other buffering portion within the scope of the invention).

In conclusion, aspects of the invention provide a number of potential advantages over a conventional solder jetting head. For example, aspects of the invention include configuring a buffering portion between the nozzle portion and the support portion. Therefore, this would absorb the impact energy generated when forming the enclosing contact. Thus, the solder particles do not accumulate as solder sheets, blockage of the nozzle opening does not occur, and the tappet portion and the nozzle portion do not deteriorate. Thus, replacement or cleaning of the solder jetting head is not required. Thus, certain embodiments may increase efficiency and decrease production costs.

The buffering portion of the invention may include one or more of: the elastic structure, the spring structure, the magnetic structure, the air cushioning structure, and/or the damper structure. The buffering portion is not limited to the exemplary structures illustrated in FIGS. 2-8.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A solder jetting head for depositing a solder paste onto a target surface, comprising:
   a tappet portion driven to provide a striking force;
   a nozzle portion for forming an enclosing contact with the tappet portion, the nozzle portion being configured to force the solder paste to exit from the nozzle portion;
   a support portion for supporting the nozzle portion; and
   a buffering portion positioned between the support portion and the nozzle portion, the buffering portion being formed of an elastic structure that deforms as a result of the enclosing contact and reforms when the enclosing contact ends, and the buffering portion being configured to absorb impact energy generated when the enclosing contact is formed.

2. The solder jetting head of claim 1 wherein the buffering portion includes a plurality of elastic material layers.

3. The solder jetting head of claim 1 wherein the buffering portion includes a thermoplastic elastomer.

4. The solder jetting head of claim 1 wherein the buffering portion includes a plurality of layers of different material.

5. The solder jetting head of claim 4 wherein the buffering portion includes a first layer, a second layer, and a third layer.

6. The solder jetting head of claim 5 wherein the first layer includes a first material, the second layer includes a second material, and the third layer includes the first material.

7. The solder jetting head of claim 1 wherein the buffering portion includes a layer of natural rubber between two layers of a thermoplastic elastomer.

8. A dispensing system for depositing a solder paste onto a target surface, the dispensing system comprising:
   a support structure for supporting a workpiece during a dispensing operation; and
   a solder jetting head including (i) a tappet portion driven to provide a striking force, (ii) a nozzle portion for forming an enclosing contact with the tappet portion, the nozzle portion being configured to force the solder paste to exit from the nozzle portion, (iii) a support portion for supporting the nozzle portion, and (iv) a buffering portion positioned between the support portion and the nozzle portion, the buffering portion being formed of an elastic structure that deforms as a result of the enclosing contact and reforms when the enclosing contact ends, and the buffering portion being configured to absorb impact energy generated when the enclosing contact is formed.

9. The dispensing system of claim 8 further comprising a motion system for moving the solder jetting head with respect to the support structure.

10. The dispensing system of claim 8 further comprising a solder supply for providing solder to the solder jetting head.

11. The dispensing system of claim 8 wherein the buffering portion includes an elastic structure.

12. The dispensing system of claim 8 wherein the buffering portion includes a thermoplastic structure.

13. The dispensing system of claim 8 wherein the buffering portion includes a plurality of elastic material layers.

14. The dispensing system of claim 8 wherein the buffering portion includes a layer of natural rubber between two layers of a thermoplastic elastomer.

15. The dispensing system of claim 8 wherein the buffering portion includes a plurality of layers of different material.

16. The dispensing system of claim 15 wherein the buffering portion includes a first layer, a second layer, and a third layer.

17. The dispensing system of claim 16 wherein the first layer includes a first material, the second layer includes a second material, and the third layer includes the first material.

* * * * *